(12) United States Patent
Johnson

(10) Patent No.: US 11,313,649 B1
(45) Date of Patent: Apr. 26, 2022

(54) ELEVATION RANGE METER AND METHOD OF RANGING A TARGET USING SAID ELEVATION RANGE METER

(71) Applicant: Ryan Johnson, Marana, AZ (US)

(72) Inventor: Ryan Johnson, Marana, AZ (US)

(*) Notice: Subject to any disclaimer, the term of this patent is extended or adjusted under 35 U.S.C. 154(b) by 110 days.

(21) Appl. No.: 16/944,924

(22) Filed: Jul. 31, 2020

(51) Int. Cl.
*F41G 3/00* (2006.01)
*F41G 3/06* (2006.01)
*F41G 1/38* (2006.01)
*G01C 3/00* (2006.01)

(52) U.S. Cl.
CPC ............ *F41G 3/06* (2013.01); *F41G 1/38* (2013.01); *G01C 3/00* (2013.01)

(58) Field of Classification Search
CPC .............. F41G 3/06; F41G 1/38; G01C 3/00
USPC ........................................................ 235/414
See application file for complete search history.

(56) References Cited

U.S. PATENT DOCUMENTS

| | | | |
|---|---|---|---|
| 2,859,256 A | 1/1943 | Grimshaw | |
| 3,161,716 A | 12/1964 | Burris, et al. | |
| 3,510,192 A | 5/1970 | Akin, Jr., et al. | |
| 3,826,012 A | 7/1974 | Pachmayr | |
| 6,279,259 B1 | 8/2001 | Otteman | |
| 6,499,382 B1 | 12/2002 | Lougheed et al. | |
| 6,568,092 B1 * | 5/2003 | Brien .................. | F41G 1/473 33/1 PT |
| 7,905,046 B2 | 3/2011 | Smith, II | |
| 8,701,330 B2 | 4/2014 | Tubb | |
| 8,770,481 B2 | 7/2014 | Hodnett et al. | |
| 8,780,333 B2 | 7/2014 | Tang et al. | |
| 9,046,321 B2 | 6/2015 | Thomas et al. | |
| 9,151,570 B2 | 10/2015 | Plaster | |
| 9,823,048 B2 | 11/2017 | Tubb | |
| 10,048,039 B1 | 8/2018 | Bell et al. | |
| 10,288,379 B2 | 5/2019 | Meinert et al. | |
| 10,302,395 B1 | 5/2019 | Holland | |
| 10,371,485 B2 | 8/2019 | Tubb | |
| 10,480,901 B2 | 11/2019 | Thomas et al. | |
| 2003/0204960 A1 * | 11/2003 | Brien ................ | F41G 1/473 33/1 PT |
| 2009/0064561 A1 | 3/2009 | Piltonen | |
| 2015/0124243 A1 | 5/2015 | Stockdill | |
| 2015/0253108 A1 | 9/2015 | Fischer | |
| 2016/0084616 A1 | 3/2016 | Jahromi | |

* cited by examiner

*Primary Examiner* — Daniel A Hess

(57) ABSTRACT

An elevation range meter is configured to be used in conjunction with a reticle to provide an offset range marking, such as an offset range distance that a target is located over on the reticle before firing. An offset range distance factors in the range to the target and the elevation of the firearm. The elevation range meter has a weighted dial that rotates with respect to the barrel or elevation angle to indicate an offset range marking, such as a distance, milliradians or minutes of angle, from a plurality of elevation range marking columns on the weighted dial. The weighted dial may have a plurality of columns of elevation range markings and the appropriate column for the determined range may be selected to indicate the offset range distance. The user may then locate the target on the reticle at this offset range distance before firing.

20 Claims, 7 Drawing Sheets

ELEVATION RANGE METER AND METHOD OF RANGING A TARGET USING SAID ELEVATION RANGE METER

BACKGROUND OF THE INVENTION

Field of the Invention

The invention relates to an elevation range meter and a method of ranging a target using said elevation range meter having weighted dial that rotates with respect to the barrel to indicate an offset range marking, such as an offset range distance, from a plurality of elevation range marking columns on the weighted dial.

Background

Shooting long distance, such as more than 200 yds, becomes increasingly difficult as many factors that would not be significant at shorter ranges become important at these longer distances. The drop of the bullet due to gravity is one of these factors and this is complicated by the elevation angle or angle of the barrel axis with respect to horizontal when firing. The bullet may drop more when shooting downhill as the amount of atmosphere is increased closer to sea level and may drop less when firing uphill, or at a positive elevation angle. Determining the amount of offset from a ranged distance can be difficult. Long range shooting is performed during activities including, but not limited to hunting, military applications and competitions.

SUMMARY OF THE INVENTION

The invention is directed to an elevation range meter and a method of ranging a target using said elevation range meter having a weighted dial that rotates with respect to the barrel to indicate an offset range marking from a plurality of elevation range marking columns on the weighted dial. A weighted dial is configured to be coupled to a firearm, such as a long-range rifle, and an indicator affixed to the fixed support of the elevation range meter will indicate an offset range marking as a function of the elevation angle, the angle of the barrel with respect to horizontal. The weighted dial may have a plurality of columns of elevation range markings and the appropriate column for the determined range may be selected to indicate the offset range marking. The user may then locate the target on the reticle on this offset range marking, such as an offset range distance, before firing.

An exemplary weighted dial has a weighted portion that will be pulled to a vertical position, or downward, regardless of the elevation angle of the firearm. The indicator is affixed to the firearm so it will move with respect to the weighted dial. An exemplary weighted dial may have elevation range markings for a given range span, such as for every 100 yds or meters, every 200 yds or meters, every 250 yds or meters and the like. An elevation range marking may be provided as an offset range distance, such as an offset distance in yards or meters, or may be provided in milliradians or minutes of angle. A weighted dial may have two or more elevation range marking columns, three or more elevation range marking columns, four or more elevation range marking columns or five or more elevation range marking columns. The range markings or the weighted dial may be detachably attachable to the offset range meter, wherein a weighted dial or range marking attachment may be interchanged for the firing elevation above sea level. A weighted dial may be different for every 200 yds of elevation every 500 yds of elevation, every 750 yds of elevation, every 1000 yds of elevation and the like. A hunter may interchange a weighted dial, or a range marking attachment to the weighted dial for their firing elevation. The elevation range markings may be provided as a sleeve that slides over the weighted dial. A slot along the dial or other locating element may ensure proper alignment of the elevation range markings sleeve with the weighted dial. The elevation range marking sleeve may be configured to fit snuggly around the weighted dial. When setting out to hunt, the hunter may know the general range of elevation they will be hunting and may carry the appropriate one or more interchangeable weighted dials or range marking attachments, such as elevation range markings sleeves.

For targets that are closer than a threshold range, such as less than 200 yds or meters, or less than 150 yds or meters, or less than 100 yds or meters, a target offset distance markings column may be provided on the weighted dial. The target offset distance markings column provides an actual offset distance from the target that the target indicator on the reticle should be offset from the desired target before firing. The indicated target offset distance is a distance determined visually through the scope with respect to the scale of the target. For example, an elk is 150 yds away as determined by a range finder and is slightly downhill from the hunter. The hunter aims at the elk and centers the target on the reticle on the elk. The hunter then reads the indicated target offset distance marking from the target offset distance markings column on the weighted dial. The target offset distance indicated is 2.5 inches and therefore the hunter places the reticle target indicator, such as cross-hairs, 2.5 inches above the desired point of impact on the target before firing. Again, this 2.5 inches, the indicated target offset distance marking, is with respect to the scale of the Elk as seen through the scope.

The method includes providing a firearm with a scope having a reticle. A reticle will have a target indicator and calibrated elevation range markings. The firearm will have the elevation range meter attached such that the fixed support is attached with and moves with the firearm. The weighted dial will rotate with respect to the fixed support and firearm it is attached to. The weighted dial may rotate due to gravity about a spindle or shaft, and bearings may be used to enable smooth and repeatable movement of the weighted dial. The weighted dial will have a weighted portion, a portion, such as about the perimeter or about the radius that will align with vertical due to gravity pulling the weighted portion downward. The weighted portion may include a weight added to the weighted dial in a specific location. The weighted dial will have at least one column of elevation range markings. The user, such as a hunter, will find a target on the reticle and place the target indicator over said target. The distance to the target will be determined, such as by a range finder. With the target indicator of the reticle over the target, the hunter will then read an indicated offset range marking, such as an offset range distance, from the elevation range meter. The hunter will then raise the firearm to move the target within the scope over this offset range marking and fire.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
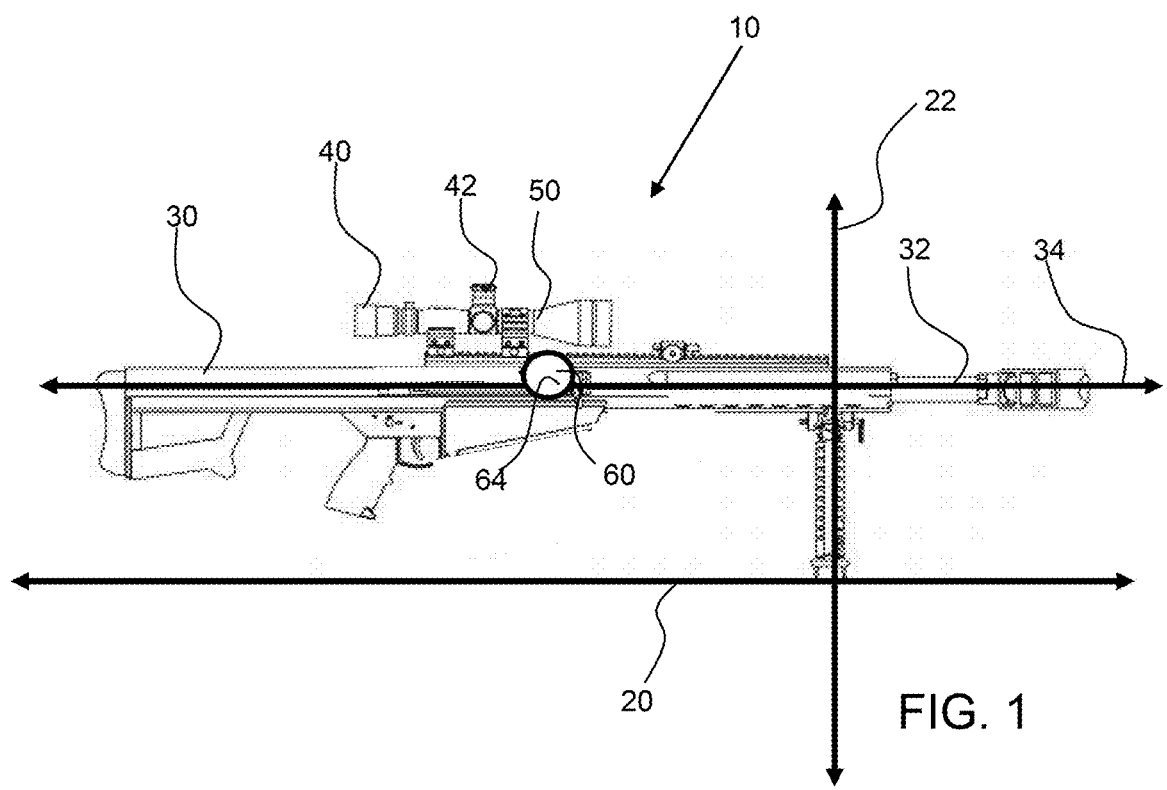
FIG. 1 shows a side view of a rifle having a scope and an elevation range meter.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an elevation range meter system 10 is utilized with a firearm 30, such as a rifle having a scope 40 and an elevation range meter 60 coupled thereto. The rifle has a barrel axis 34 that extends along the length of the barrel 32, or bore, and in this figure the barrel axis is horizontal and parallel with a horizontal axis 20. The weighted dial 64 will rotate to align the weighted portion of the weighted dial with the vertical axis 22. The rifle has a turret 42 to make the adjustments necessary to zero an optic. A reticle 50 is configured within the scope to provide a target indicator and calibrated elevation range markings.

Figure 2:
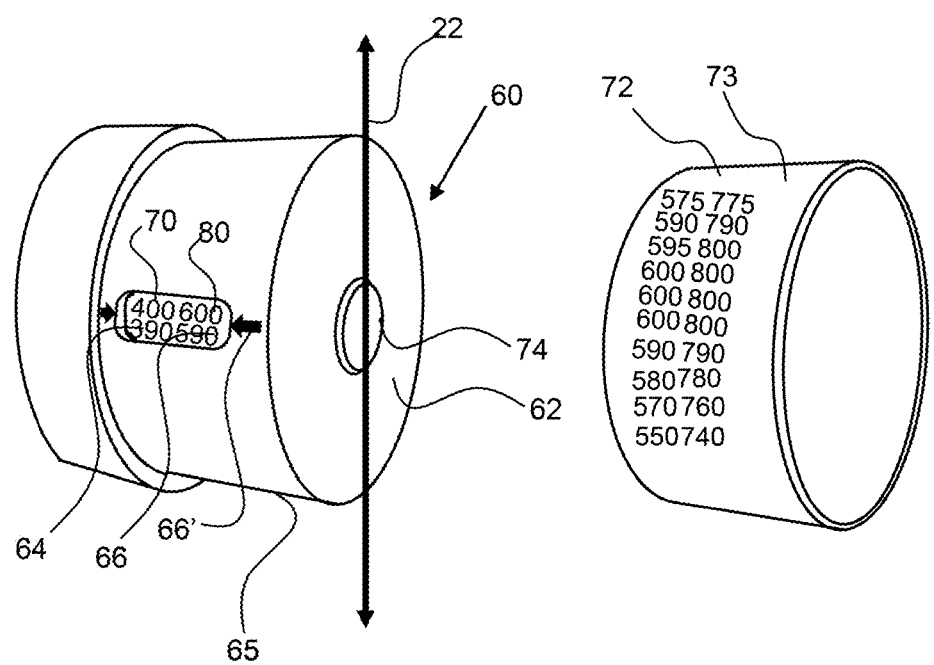
FIG. 2 shows a perspective view of an elevation range meter having a weighted portion that causes the weighted dial to rotate with respect to the fixed support to change values of the two columns of elevation range markings displayed in the window indicator.

As shown in FIG. 2, an elevation range meter 60 has a weighted portion 65 that causes the weighted dial 64 to rotate with respect to the fixed support 62 to change values of the two columns of elevation range markings 70, 80 displayed in the window indicator 66. The weighted portion rotates to align the weighted dial with a vertical axis 22, and therefore the indicator 66 will display different values. A second indicator 66', a pointer, is shown pointing to the weighted dial and the values of the two columns of elevation range markings. As shown in FIG. 2, an elevation range marking attachment 72, such as a sleeve or interchangeable weighted dial is shown. The weighted dial may be interchanged by simply sliding a new weighted dial onto a spindle 74 of the fixed support, or by interchanging an elevation range marking sleeve attachment 73.

Figure 3:
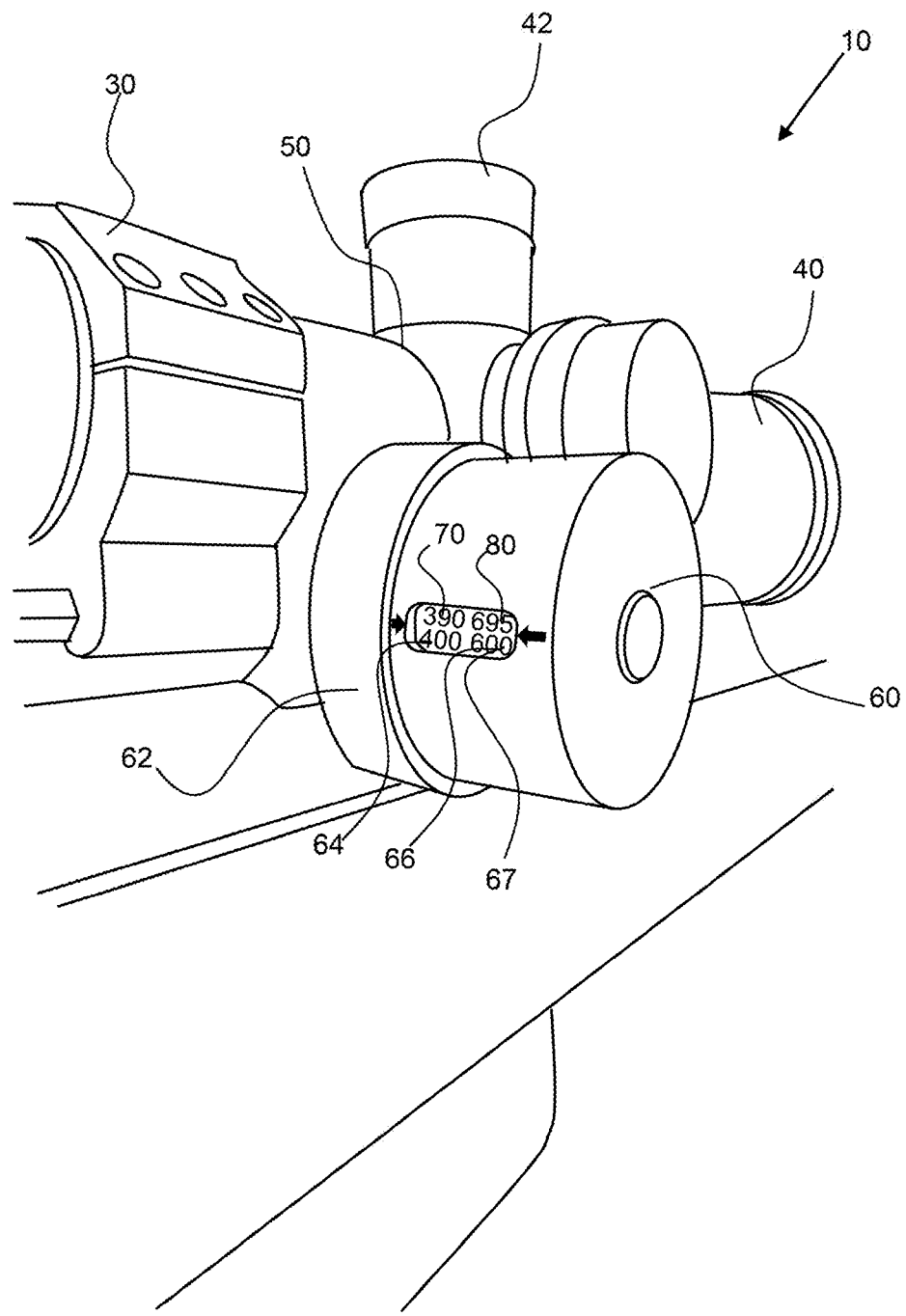
FIG. 3 shows a perspective view of an elevation range meter coupled to the rifle and having a window indicator that shows two columns of elevation range markings on the weighted dial.

As shown in FIG. 3, the exemplary elevation range meter 60 is coupled to the rifle firearm 30. The fixed support 62 of the elevation range meter is secured to the rifle such that it moves when the rifle moves to change elevation angle. The scope 40 is coupled to the firearm and has a reticle 50 that is used in conjunction with the elevation range meter. A scope may have a turret 42 for adjustment of elevation and wind offsets for lateral displacement compensation.

Figure 4:
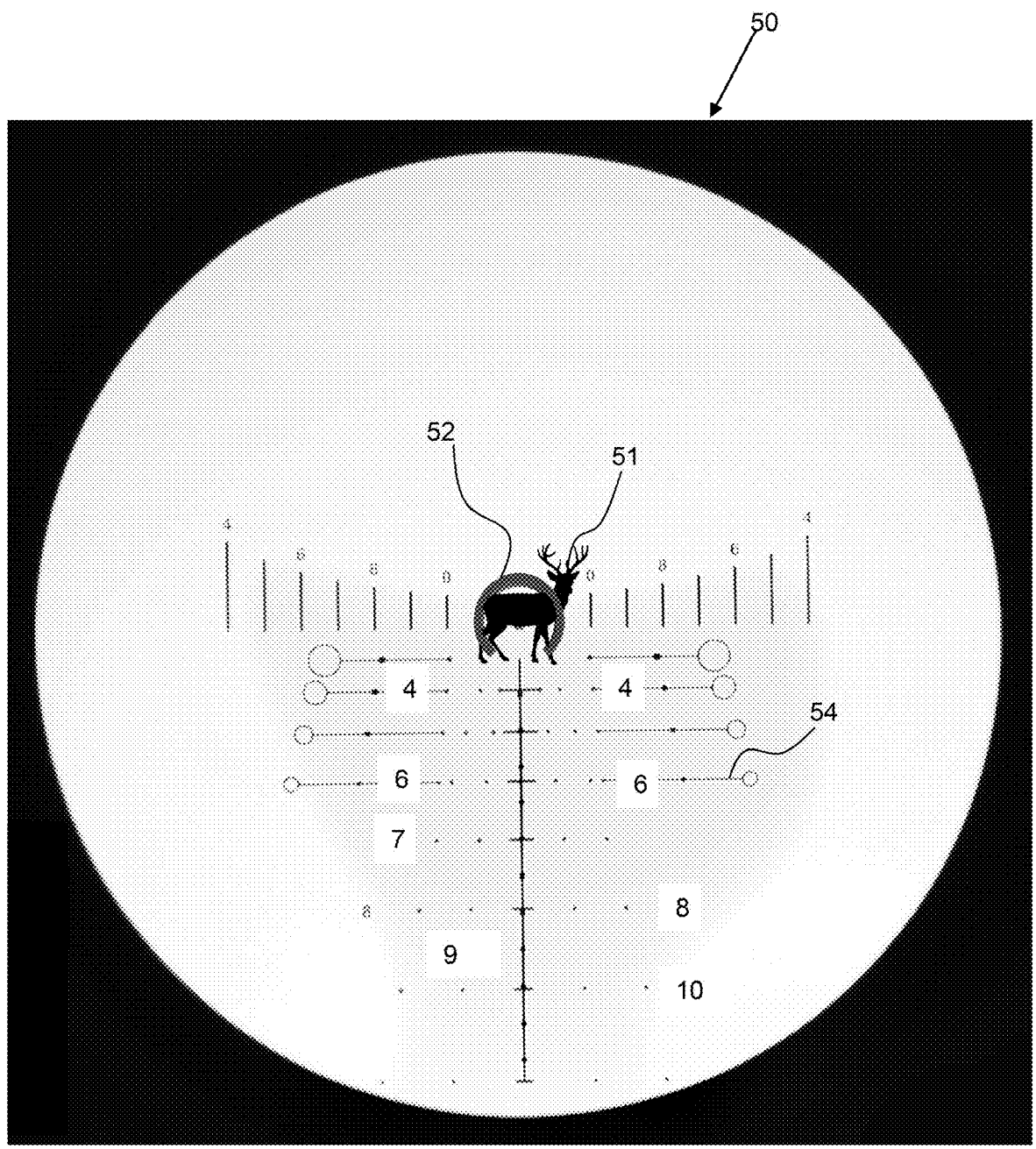
FIG. 4 shows a reticle display with a deer target located on the target indicator and calibrated elevation range markings below the target indicator for compensating for the drop of the bullet as a function of range.

As shown in FIG. 4, a deer target 51 is located on the target indicator 52 of a reticle 50 and calibrated elevation range markings 54 are below the target indicator of the reticle for compensating for the drop of the bullet as a function of range. If the target is at less than 300 yards away from the firearm, for example, no compensation may be required when the elevation angle is neutral. The first calibrated elevation range marking is for 300 yds and the markings are for each 100 yd increment up to 1000 yds. It is to be understood that the markings may be in metric units, such as meters, or other units of measure.

Figure 5:
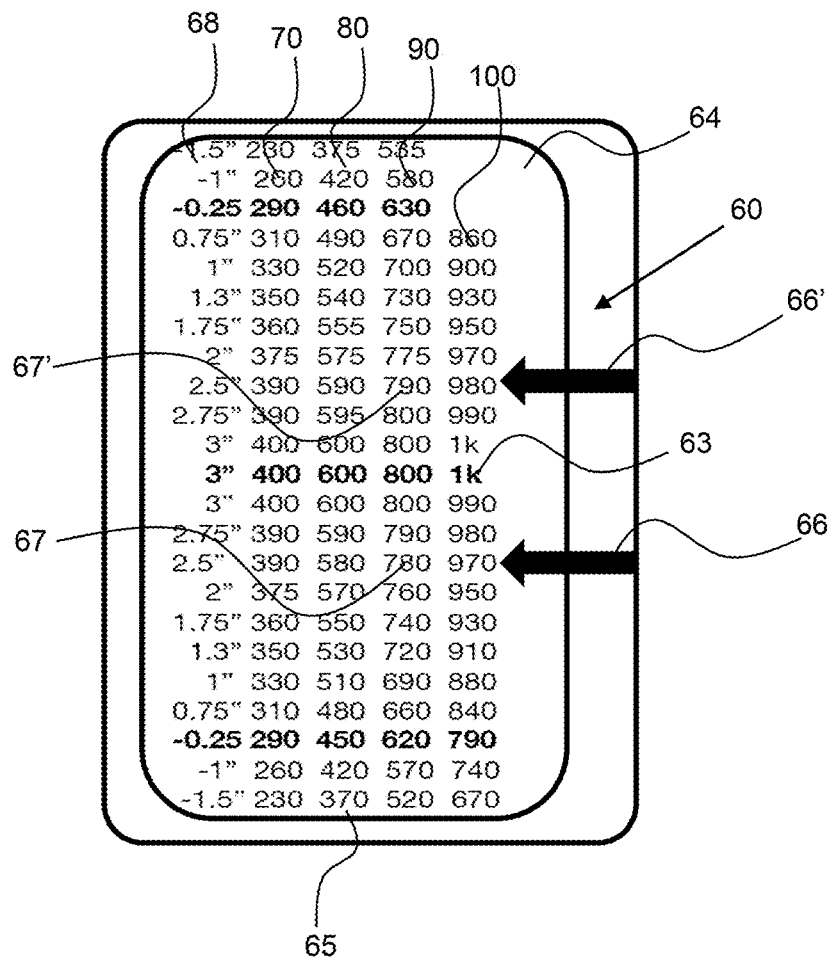
FIG. 5 shows an exemplary elevation range meter with an indicator for both an uphill and downhill shot pointing to the columns of elevation range markings.

As shown in FIG. 5, an exemplary elevation range meter 50 has a weighted dial 64 having columns of elevation range markings. An indicator 66' indicates the offset range marking 67', which is an offset range distance, for a downhill shot and an indicator 66 indicates the offset range marking 67, again an offset range distance, for an uphill shot. Both are shown to demonstrate the use of the elevation range meter 60. Note that the offset range distance for the uphill shot is little less than that for the downhill shot as there will be less atmosphere to shoot through when shooting upward in elevation. The air thins at elevation above sea level and this will impact the amount of drop of the bullet. If distance to the target was determined to be 850 yards, then the offset range distance as indicated by the elevation range meter is 790 for a downhill shot and 780 for this particular uphill shot. The column of elevation range markings 70, 80, 90 and 100 have different ranges requiring the distance to the target to be determined prior to selecting a column for determining the offset range marking, or distance in this example. The zero line 63 is for a shot less than 100 yds or 100 m away. The column of target offset distance markings 68 provides a visual offset distance for targets that are relatively close, such as less than 200 yds or 200 meters.

Figure 6:
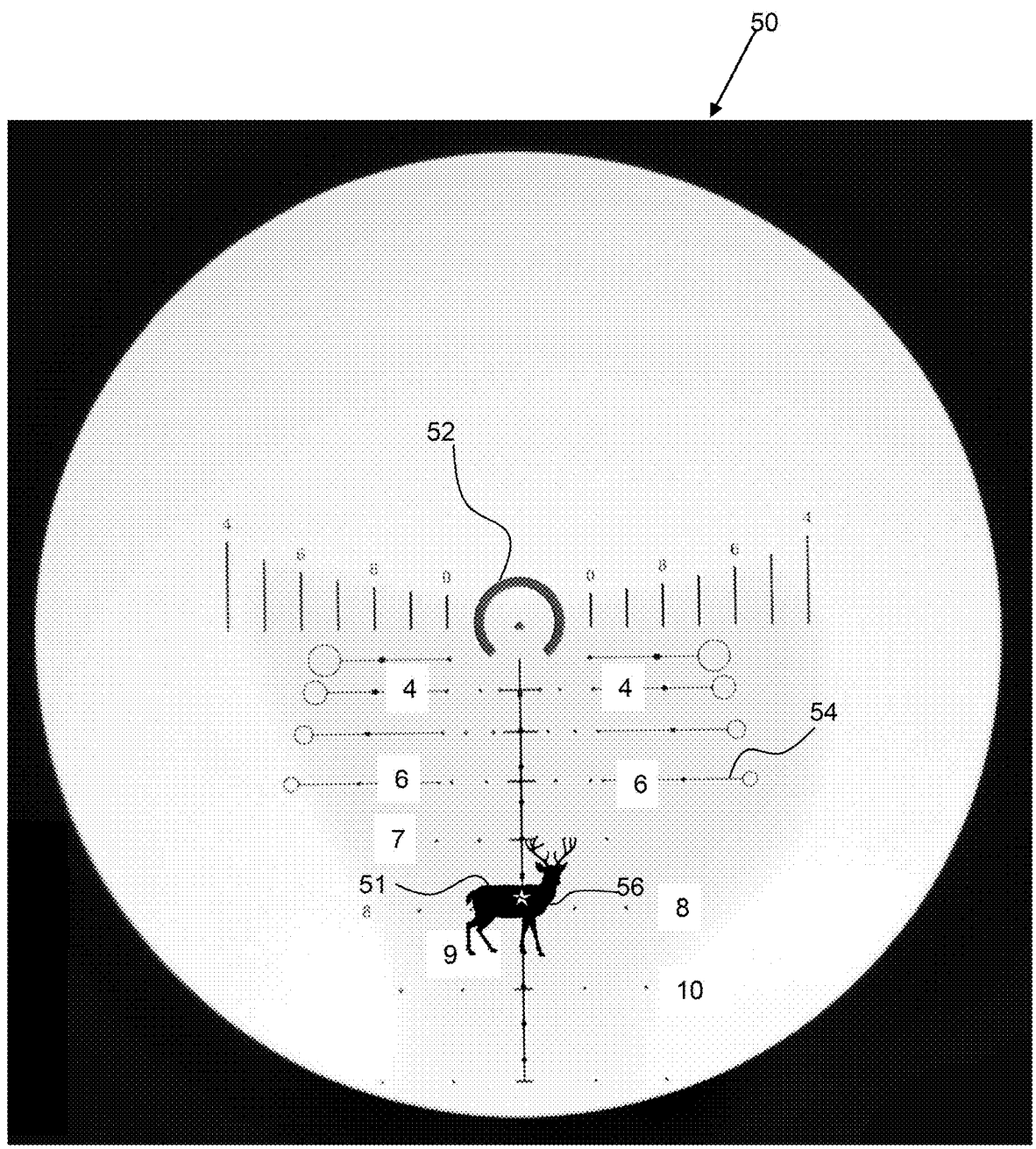
FIG. 6 shows a reticle display with the deer target now located to align with 780 yards as indicated by the elevation range meter due to the elevation of the firearm when the target was located on the target indicator of the reticle.

As shown in FIG. 6, the deer target 51 is now located to align with 780 yards, the offset range distance, as indicated by the indicated offset range marking by the elevation range meter due to the elevation of the firearm when the target was located on the target indicator of the reticle. The pull-point target position 56 on the reticle is aligned with the offset range distance to compensate for drop of the bullet with respect to the elevation angle.

Figure 7:
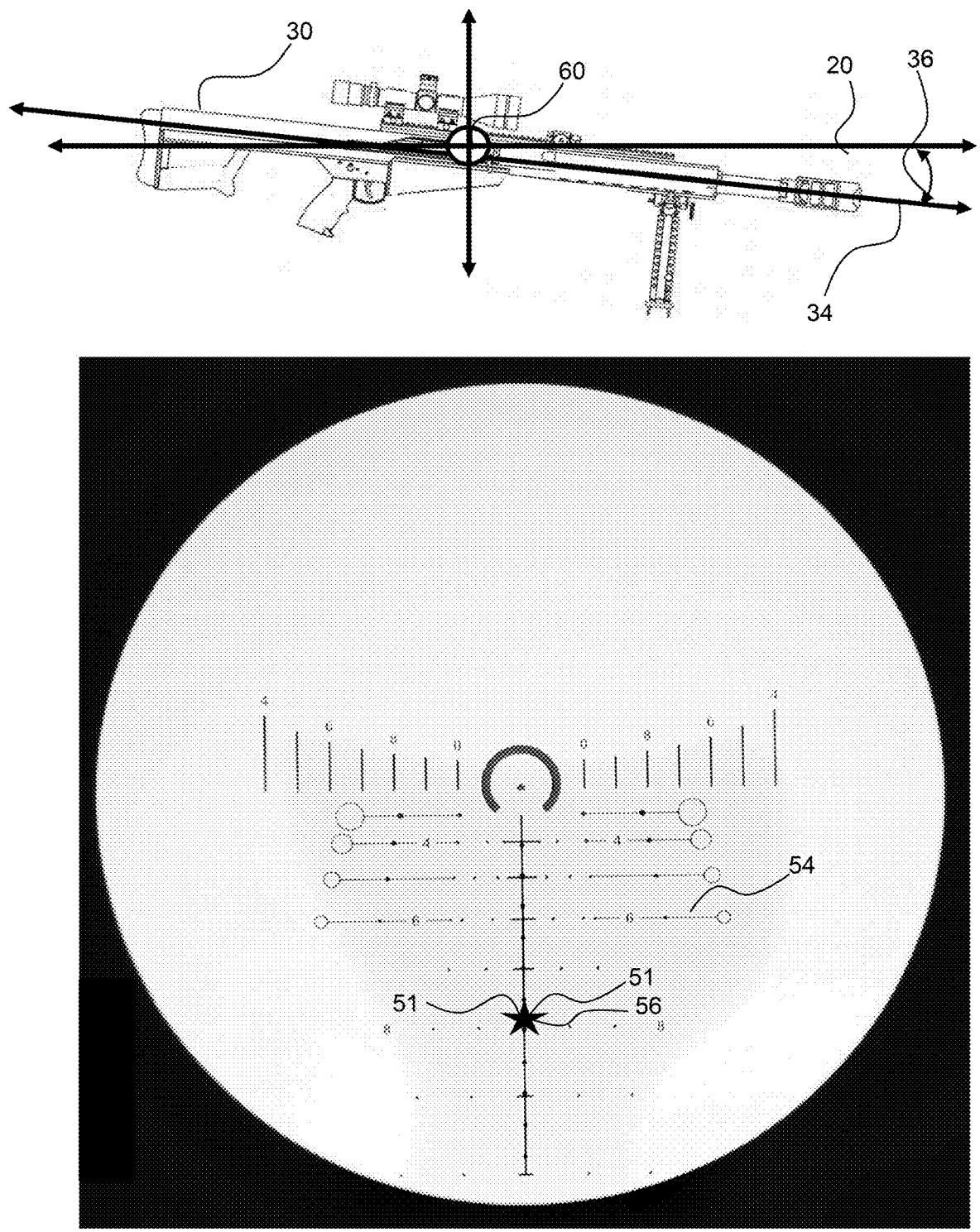
FIG. 7 shows a rifle with a negative elevation angle and the target located on the reticle to align with an indicated offset range marking, an indicated offset range distance, indicated by the elevation range meter.
Figure 8:
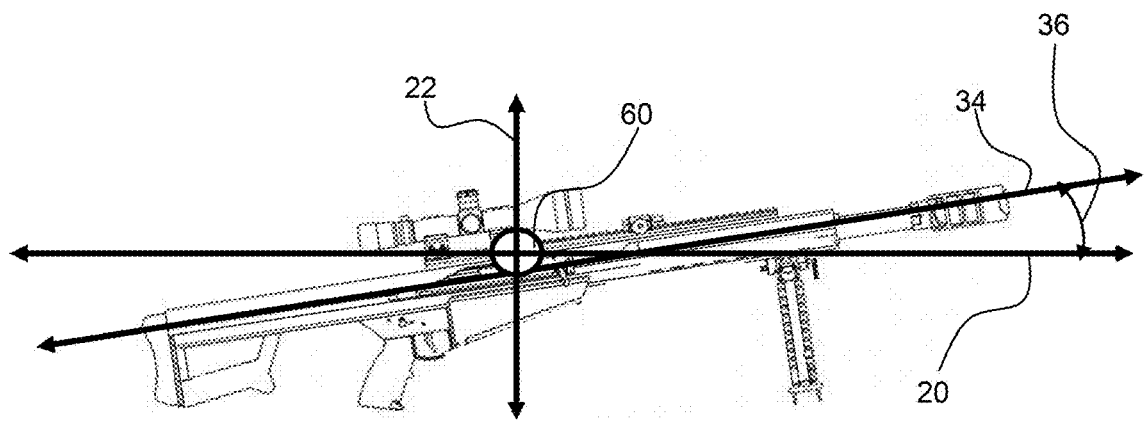
FIG. 8 shows a rifle with a positive elevation angle and the target located on the reticle to align with an indicated offset range marking by the elevation range meter; the indicated offset range distance is larger than that shown in FIG. 7.
Figure 8:
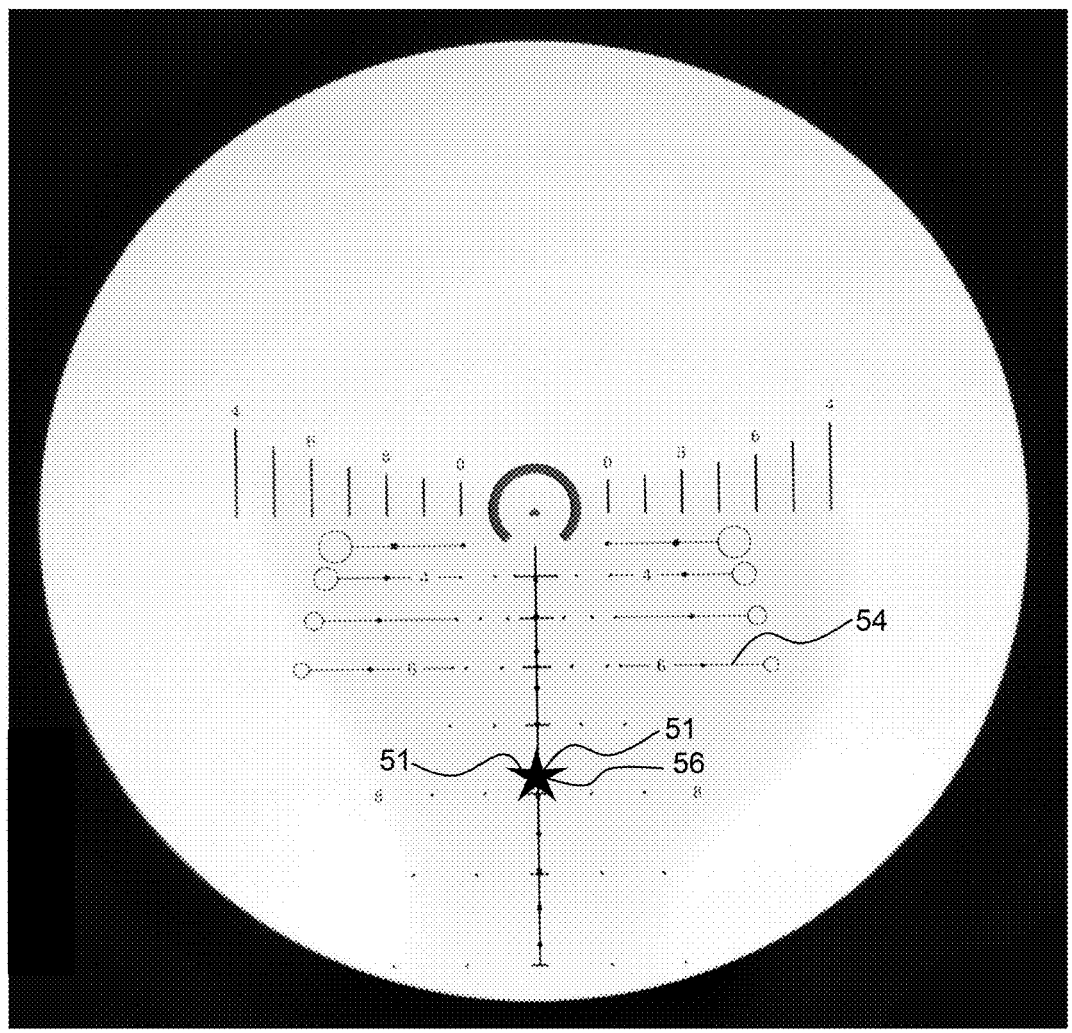

Referring now to FIGS. 7 and 8, the offset range distance will be less for elevation angles that are positive, firing uphill, than negative elevation angles, or firing downhill. As shown in FIG. 7, the barrel axis 34 of the firearm 30 produces a negative elevation angle 36, wherein the barrel axis is below the horizontal axis 20. The exemplary elevation range meter will automatically indicate an offset range marking which may be an offset range distance due to the weighted dial rotating with respect to the fixed support and indicator. The firearm can then be angled or tilted to change the elevation and move the target 51 on the reticle to align with the offset range distance, such as 790, as shown in FIG. 7. As shown in FIG. 8, the elevation angle 36 is positive, wherein the barrel axis 34 is above the horizontal axis 20 at the end of the barrel. The firearm is angled or tilted to change the elevation and move the target 51 on the reticle to align with the offset range distance, such as 780. The downhill shot will require a larger offset, as shown on the reticle of FIG. 5, with the target being aligned with 790 yds versus 780 yards for the uphill shot. These are examples of how the elevation range meter provides quick offset range markings, or distances that can then be used for alignment of a target on the calibrated elevation range markings 54 of the reticle.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of ranging a target comprising:
  a) providing a firearm;
  b) providing a scope having a reticle having a target indicator and calibrated elevation range markings;
  c) providing an elevation range meter comprising:
    i) a fixed support having an indicator;
    ii) a weighted dial that rotates with respect to the fixed support to position a weighted portion at a bottom of the dial with respect to a vertical axis;
    iii) a first column of elevation range markings;
    wherein the weighted dial rotates with respect to the fixed support as an elevation of the firearm is changed and wherein an offset range marking indicated by the indicator from the first column of elevation range markings changes as the weighted dial rotates;
  d) finding a target in the scope and locating the target indicator of the reticle over said target;
  e) determine a distance to the target,
  f) allowing the elevation range meter to rotate with respect to the fixed support to indicate an offset range marking;
  g) reading said offset range marking indicated by the indicator of the elevation range meter; and
  h) changing the elevation of the firearm to locate the target in the scope with at said offset range marking on the calibrated elevation range markings of the reticle.

2. The method of ranging a target of claim 1, further comprising a second column of elevation range markings on the weighted dial.

3. The method of ranging a target of claim 2, wherein the first column of elevation range markings is a lesser distance than the second column of elevation range markings.

4. The method of ranging a target of claim 3, wherein the first column of offset range markings is at least 200 yards.

5. The method of ranging a target of claim 3, comprising four or more columns of elevation range markings.

6. The method of ranging a target of claim 3, wherein the first column of elevation range markings are target offset distance markings.

7. The method of ranging a target of claim 1, wherein the indicator of the elevation range meter is a window in the fixed support.

8. The method of ranging a target of claim 1, wherein the indicator of the elevation range meter extends horizontally across a portion of the weighted dial.

9. The method of ranging a target of claim 1, wherein the indicator of the elevation range meter is a pointed.

10. The method of ranging a target of claim 1, wherein the first column of elevation range markings detachably attachable to the elevation range meter.

11. An elevation range meter system comprising:
  a) a reticle having a target indicator and calibrated elevation range markings;
  b) an elevation range meter;
    i) a fixed support having an indicator;
    ii) a weighted dial that rotates with respect to the fixed support to position a weighted portion at a bottom of the dial with respect to a vertical axis
    iii) a first column of elevation range markings configured on the weighted dial;
  wherein the weighted dial rotates with respect to the fixed support as an elevation of the firearm is changed and wherein an offset range marking indicated by the indicator from the first column of elevation range markings changes as the weighted dial rotates.

12. The elevation range meter system of claim 11, further comprising a second column of elevation range markings on the weighted dial.

13. The elevation range meter of claim 12, wherein the first column of elevation range markings is a lesser distance than the second column of elevation range markings.

14. The elevation range meter of claim 13, wherein the first column of offset range markings is at least 200 yards.

15. The elevation range meter system of claim 13, comprising four or more columns of elevation range markings.

16. The elevation range meter of claim 13, wherein the first column of elevation range markings are target offset distance markings that indicate an offset distance to place the target indicator with respect to a target.

17. The elevation range meter of claim 11, wherein the indicator of the elevation range meter is a window in the fixed support.

18. The elevation range meter of claim 11, wherein the indicator of the elevation range meter extends horizontally across a portion of the weighted dial.

19. The elevation range meter of claim 11, wherein the indicator of the elevation range meter is a pointed.

20. The elevation range meter of claim 11, wherein the first column of elevation range markings detachably attachable to the elevation range meter.

\* \* \* \* \*